United States Patent [19]

Astmann

[11] Patent Number: 4,853,956
[45] Date of Patent: Aug. 1, 1989

[54] COMMUNICATION SYSTEM DISTRIBUTED PROCESSING MESSAGE DELIVERY SYSTEM

[75] Inventor: Robert H. Astmann, Eatontown, N.J.

[73] Assignees: American Telephone and Telegraph Company, New York, N.Y.; AT&T Information Systems Inc., Morristown, N.J.

[21] Appl. No.: 496,484

[22] Filed: May 20, 1983

[51] Int. Cl.$^4$ .............................................. H04Q 9/00
[52] U.S. Cl. .................................................. 379/269
[58] Field of Search ............... 370/60, 94, 92, 82, 370/83, 91, 94, 99, 67; 364/200, 900, 749; 379/269

[56] References Cited

U.S. PATENT DOCUMENTS

| | | | |
|---|---|---|---|
| 3,207,851 | 9/1965 | Fukinuki | 370/99 |
| 3,516,073 | 6/1970 | Goss et al. | 364/200 |
| 3,855,422 | 12/1974 | Cadiou et al. | 370/99 |
| 3,873,920 | 3/1975 | Apple, Jr. et al. | 371/42 |
| 3,909,800 | 9/1975 | Recks et al. | 364/200 |
| 3,988,545 | 10/1976 | Kuemmerle et al. | 370/60 |
| 4,205,200 | 5/1980 | Parikh et al. | 370/91 |
| 4,241,398 | 12/1980 | Carll | 364/200 |
| 4,309,765 | 1/1982 | Müeller et al. | 370/99 |
| 4,313,162 | 1/1982 | Baun et al. | 364/200 |
| 4,315,310 | 2/1982 | Bayliss et al. | 364/200 |
| 4,317,196 | 2/1982 | Ulug | 370/94 |
| 4,317,962 | 3/1982 | Cox et al. | 379/269 |
| 4,366,479 | 12/1982 | Mori et al. | 370/94 |
| 4,379,950 | 4/1983 | Ahmed | 379/269 |
| 4,389,720 | 6/1983 | Baxter et al. | 370/62 |
| 4,410,889 | 10/1983 | Bryant et al. | 370/94 |
| 4,421,955 | 12/1983 | Mori et al. | 379/269 |
| 4,424,565 | 1/1984 | Larson | 364/200 |
| 4,437,165 | 3/1984 | Onodera | 364/749 |
| 4,482,951 | 11/1984 | Swaney et al. | 364/200 |
| 4,484,328 | 11/1984 | Schlafly | 370/99 |
| 4,491,908 | 1/1985 | Woods et al. | 364/200 |
| 4,495,572 | 1/1985 | Bosen | 364/200 |
| 4,516,239 | 5/1985 | Maxemchuk | 370/94 |
| 4,554,660 | 11/1985 | Noirel et al. | 370/94 |
| 4,577,317 | 3/1986 | Chu et al. | 370/110.1 |
| 4,633,039 | 12/1986 | Holden | 379/269 |

OTHER PUBLICATIONS

Tanenbaum, A. S., "Computer Networks", Prentice-Hall International, Inc., 1981, pp. 364–368 and 505.
Bob Cram, "Codes and Formats for GPIB Instruments", 1980, IEEE *Autotestcon*.

Primary Examiner—Gareth D. Shaw
Assistant Examiner—Johathan C. Fairbanks
Attorney, Agent, or Firm—David H. Tannenbaum; David R. Padnes

[57] ABSTRACT

There is disclosed a message formatting arrangement which allows messages from a central processor to be distributed over a bus to a plurality of remote processors using a single address presentation for any message without regard to the byte length of the message. Each message consists of a variable number of sub-messages each having a 3-bit qualifier which specifies the sub-message type. Each remote processor is capable of determining the length of each sub-message depending jointly upon the value of the qualifier and upon the context byte which precedes each group of sub-messages. The remote processors having the capability of skipping over a variable number of idle frames without beginning to process a new message.

21 Claims, 15 Drawing Sheets

MESSAGE INTERPRETATION - GENERAL CASE

FIG. 4

NETWORK UPDATE MESSAGE (ADD NEW PARTY TO EXISTING 4-PARTY CONFERENCE CALL)

| MESSAGE LENGTH | — 401 |

QUALIFIER FOR COMMAND | NETWORK UPDATE COMMAND
| 0 0 0 | 0 0 0 0 1 | — 402

QUALIFIER FOR PORT #
| 0 0 1 | PORT # | — 403

QUALIFIER FOR "TALK" SUB MSG
| 0 1 0 0 0 0 b a | — 404
| TIME SLOT # | — 405
| s 0 0 0 VALUE IN DB | — 406

$a = \begin{cases} 0 - \text{BUS A} \\ 1 - \text{BUS B} \end{cases}$ $b = \begin{cases} 0 - \text{ENABLE} \\ 1 - \text{DISABLE} \end{cases}$ $s = \begin{cases} 0 - \text{GAIN} \\ 1 - \text{LOSS} \end{cases}$ QUALIFIER FOR "LISTEN" SUB MSG
| 0 1 1 0 0 0 0 a | — 407
| TIME SLOT # | — 408
| s 0 0 0 VALUE IN DB | — 409

| 0 1 1 | — 410
| | — 411
| | — 412

| 0 1 1 | — 413
| | — 414
| | — 415

| 0 1 1 | — 416
| | — 417
| | — 418

QUALIFIER FOR MESSAGE "TRAILER"
| 1 1 1 | SEQUENCE # | — 419
| CHECKSUM | — 420

GENERATION OF NETWORK UPDATE COMMAND

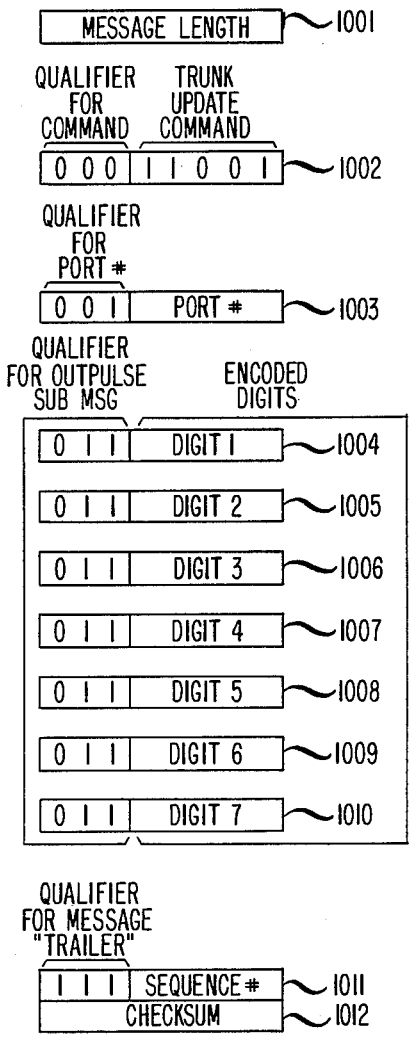

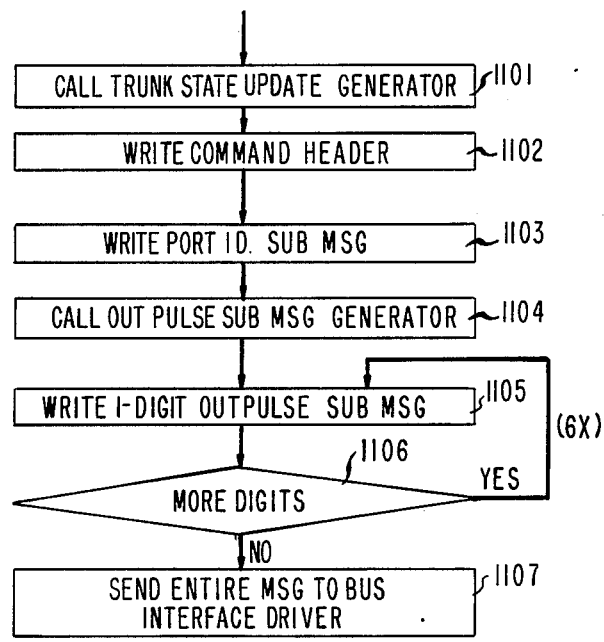
FIG. 11  GENERATION OF TRUNK UPDATE COMMAND
(OUTPULSE A 7-DIGIT NUMBER)
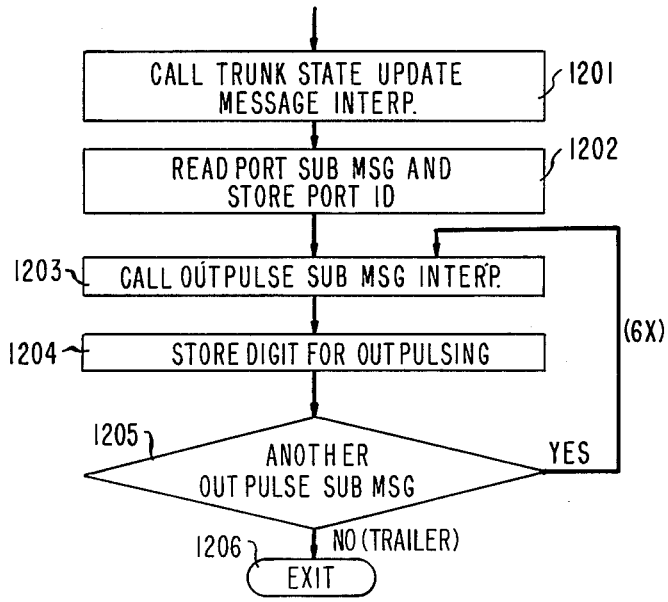
FIG. 12  INTERPRETATION OF TRUNK UPDATE COMMAND
(CORRECT CHECKSUM ASSUMED)

DOWNLINK MESSAGE HANDLING
(BUS INTERFACE PROCESSOR)

DOWNLINK MESSAGE HANDLING (PORT PROCESSOR)

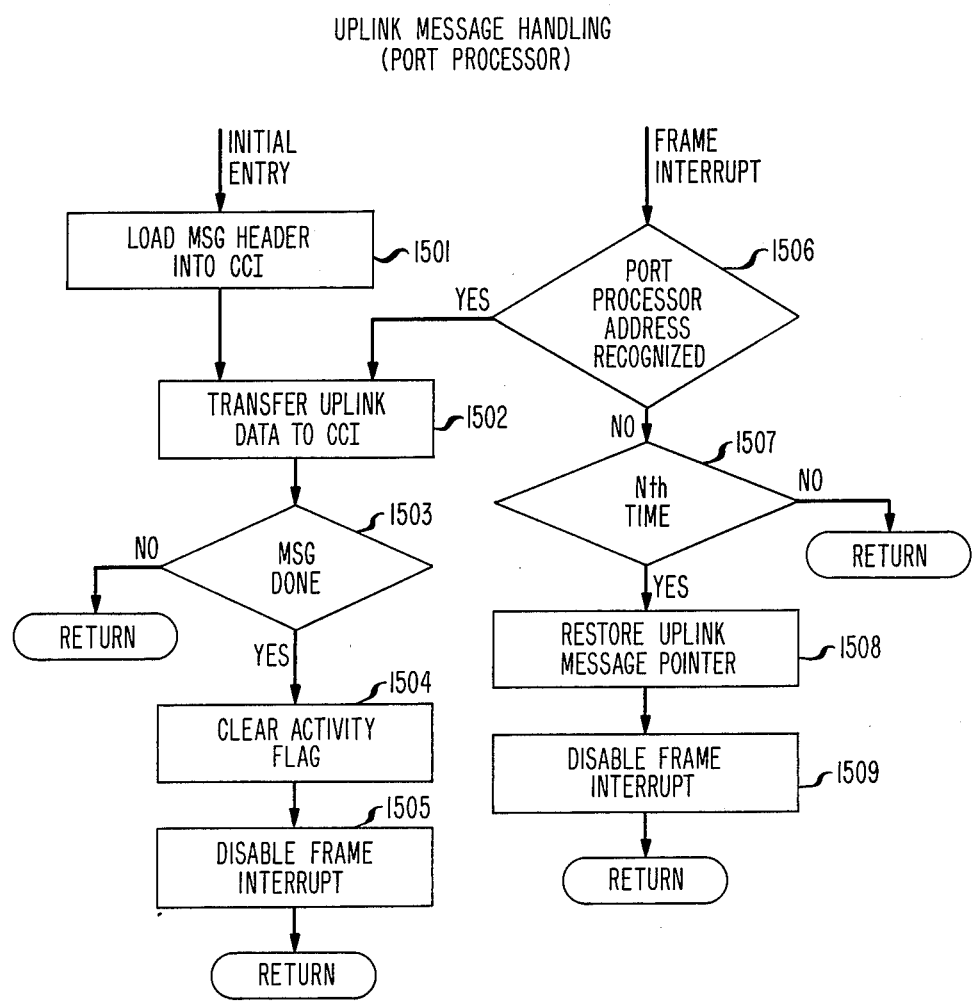

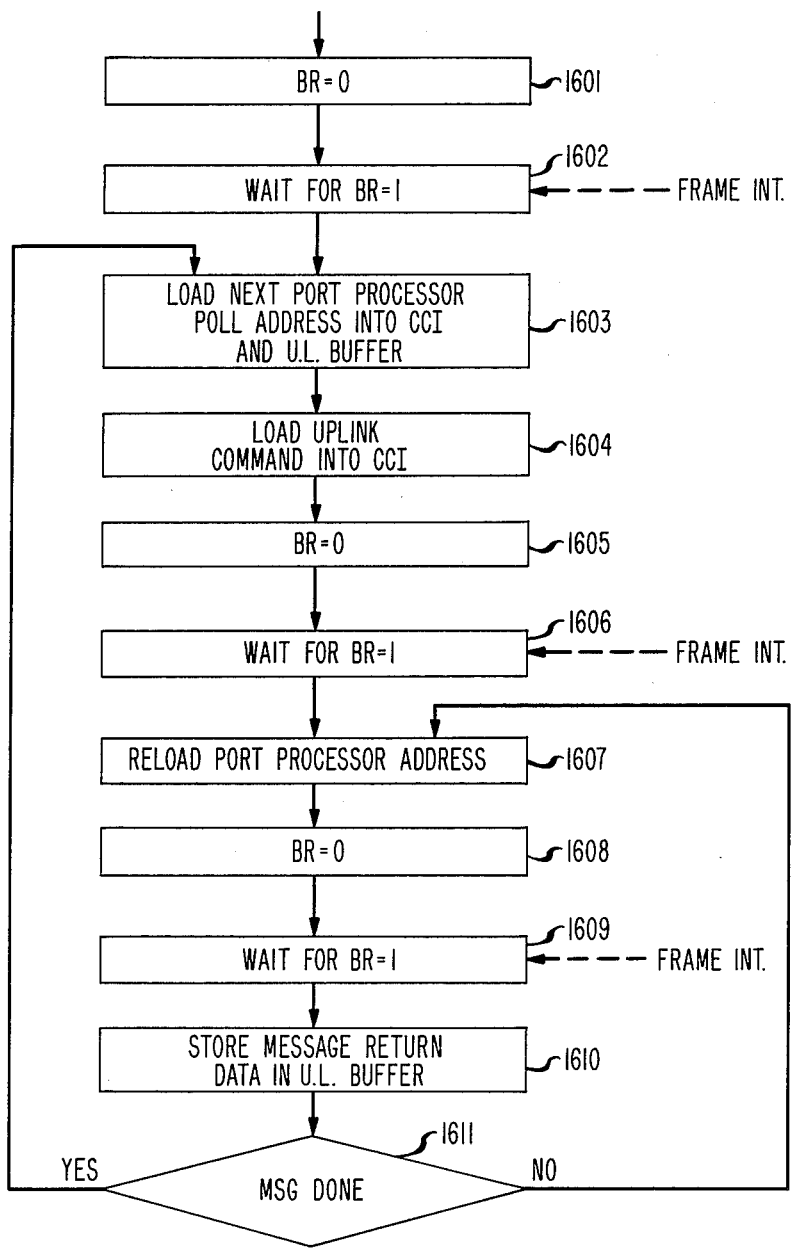

COMMUNICATION SYSTEM DISTRIBUTED PROCESSING MESSAGE DELIVERY SYSTEM

BACKGROUND OF THE INVENTION

This invention relates to a distributed processing message delivery system operable for controlling the distribution of variable length messages between processors.

In communication systems (or other types of control systems) it is typical for numerous messages to pass between a central processor and any number for remote processors. These remote processors, for example, may be located on interface boards and serve to control a number of individual ports or telephone stations. For each transaction, e.g., an off-hook at a calling station, many individual functions must be changed at the station. These functions may include the changing of the lamp information, ringing status, or delivery of specialized messages such as "All Lines Busy" on alphanumeric displays. The ability of the central processor to pass each of the messages to the various remote processors for subsequent control of the individual ports or stations affects the call capacity of the processor.

Another problem faced by such systems is that each message requires considerable processor overhead in formatting for delivery to the remote processors. This overhead includes the addition of header information containing the address of the desired remote processor, and the addition of checksums at the end of the message to insure proper delivery of the message. All of this requires valuable processor time, and when the message size is small, this overhead must be expended for each message. Thus, when multiple small messages are destined for the same remote processor, valauble time is wasted in formatting the messages.

One solution to the problem would be to send a single message to each station containing all of the necessary information. However, such a solution proves difficult in that there is a variable number of messages which must be communicated, each message having a variable number of bytes of information. For example, ringing information may be conveyed with a few bits, while lamp information may require several 8-bit bytes. The size of a display message, of course, depends upon the number of information characters to be displayed at the telephone console. Thus, using a single fixed size message packet having a fixed number of bytes would be wasteful of bandwidth.

SUMMARY OF THE INVENTION

These and other problems have been solved by grouping the information from the main processor in accordance with predefined functions and sending an entire group of sub-messages within a single message packet, using a single address header and a single checksum at the end. Each message is variable in length and headed by a context type which identifies the type or group of information which is to follow. Each subsequent "sub-message" in the packet contains a fixed 3-bit qualifier which identifies the specific type of sub-message being received. The remote processors then, using the 3-bit qualifier, can determine the byte length of each sub-message.

Since the packet is sent under a single address header, it may happen that the main processor is too busy in any one cycle to place valid information on the bus to the remote processors. In this situation, if nothing more were to be done, the remote processor, seeing no information, could assume the start of a new message when information is next presented. Merely skipping over blank or missing information bytes is insufficient to cure the problem since the remote processors may have to skip over one, two, or even more frames while the main processor is busy doing other tasks.

If each message were to be preceded by its own header, and if the message were short enough to fit into one frame, then such a problem is non-existent since the remote processors would only handle information validly addressed to them. However, when a processor is responding over a number of frames to a continuing message consisting of an indeterminate number of sub-messages, skipped frames become critical.

This problem is addressed by an arrangement wherein as the main processor becomes more and more loaded, each remote processor is allowed to skip a predetermined number of frames before recycling into a new message.

BRIEF DESCRIPTION OF THE DRAWING

The operation of my invention can be seen from a review of the drawing in which:

FIGS. 4–6 are flow charts showing network update message control,

FIGS. 7–12 are flow charts showing trunk and station message content, and

FIGS. 13–16 are flow charts showing downlink and uplink message handling control.

DETAILED DESCRIPTION

Figure 1:
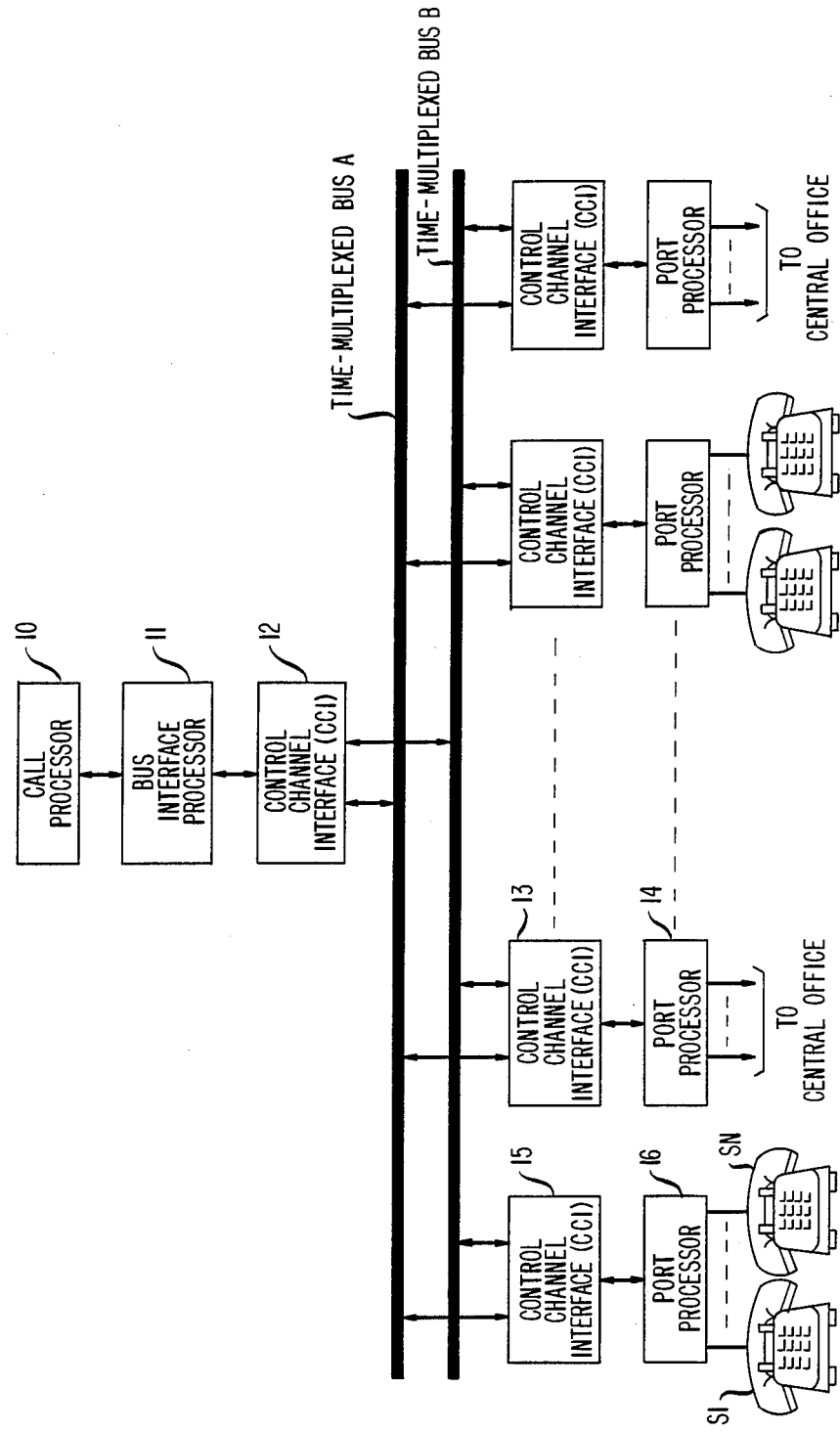
FIG. 1 is a schematic view of a telephone system architecture using my invention.

FIG. 1 is a drawing of the architecture of the system in which this invention has been practiced. This system is a telephone PBX, and in such a system it is necessary to be able to provide communications between a large number of internal stations such as stations S1-SN, or between those stations and external stations (not shown) to which connections are made via trunks either going to a central office or to another PBX. Therefore, we have a large number of port processors, each of which controls some number of interfaces to either stations or trunks, or which controls a certain number of signaling tone sources or detectors.

Port Processor 16 is shown controlling a group of telephone stations S1-SN, while port processor 14 is shown controlling trunks to a central office. Call processor 10 is typically a high-speed microprocessor such as Intel 8086. This call processor must be able to send commands to any number of these port processors, or to receive stimuli from the port processors via either Bus A or Bus B. The command structure of this invention was arranged to control communications in a system of the type shown in now allowed patent application Ser. No. 256,937 of Baxter, Berkowitz and Buzzard filed Apr. 23, 1981 which application is hereby incorporated herein by reference.

For purposes of discussion the description will be separated into a first part which deals with the message format which allows the call processor to efficiently send commands to the port processors. This part of the discussion is independent of the structure of the system over which these messages flow. The second part of the discussion will center around the details of the actual signaling channel used to carry these messages. This signaling channel is in turn controlled by bus processor 11, which is a general purpose micro-computer such as Intel 8051.

Control channel interface 12 (CCI) is the subject of a concurrently filed copending patent application of Koenig-Oye which application is hereby incorporated herein. Control channel interfaces 13 and 15 interface the time division multiplex bus to a port processor.

General Description

Figure 2:
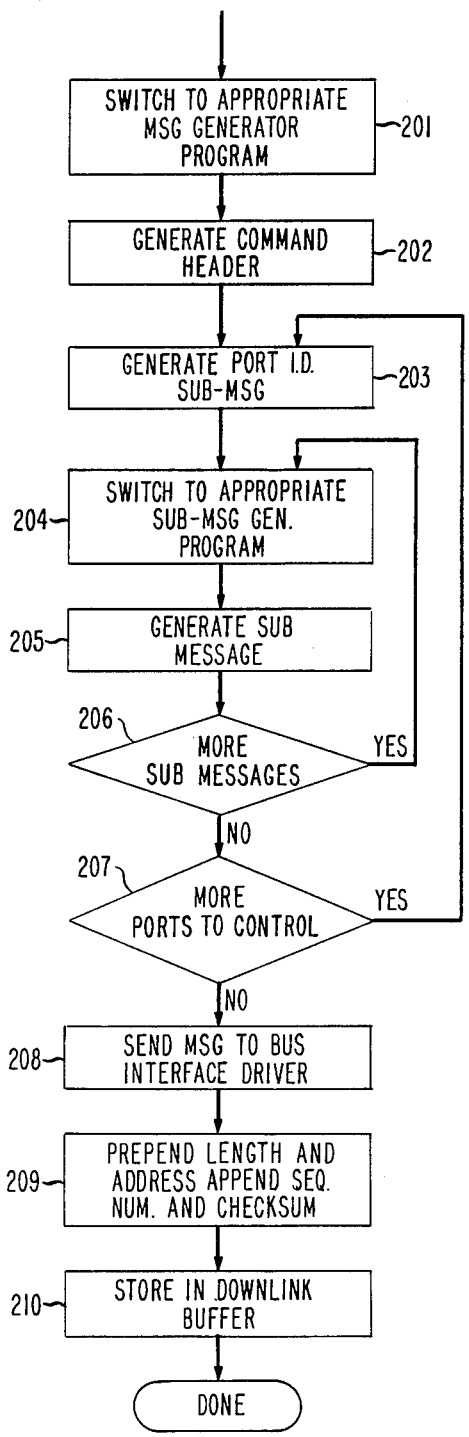
FIGS. 2 and 3 are flow charts showing generalized message generation and message interpretation.

FIG. 2 is a flow chart showing the process by which, in very general terms, a message is generated in accordance with the concepts being set forth in this invention. The assumption here is that we are at a point in the system operation where it is necessary to send a message to a port processor. The message can consist of any number of sub-messages, provided that all the messages are destined for the same port processor and they are all of a general type.

The first step is shown in box 201 where we switch to the appropriate message generator program. For each type of port processor operation, there is a routine capable of generating a particular type of message. Given that, box 202 generates a command header which is the first byte of a message. This header sets the context in which the later sub-messages will be interpreted. Next, box 203 generates a sub-message which contains the port number for which at least the first part of the message is destined. At this point we have set the context wherein a particular type of message is destined for a specified port on a board controlled by the selected port processor.

Box 204 controls a switch to a sub-program which is capable of generating the particular type of sub-message corresponding to the type of function to be performed. Box 205 generates the actual sub-message. Box 206 determines whether there are more sub-messages to be generated, and if the answer is yes, the routine returns to box 204 to generate another sub-message. If the answer is no, it means that we have finished sending sub-messages to that particular port, and box 207 controls a return to box 203 if there are more ports to control. If not, the formatting for this particular message is finished. Box 208 controls the transmission of the entire message as it presently exists to a bus interface driver routine. This routine is concerned with the details of interfacing to the time division bus through the bus interface processor. Box 209 controls the prepending to the message of the address of the port processor to which this message is being sent. Also attached to the message is the length of the entire message. Both of these items of information are received from the higher level routine that generated this message. After the length and address have been attached, there is appended at the end of the message a sequence number to identify this message for purposes of acknowledgement. Also added to the end of the message is a check-sum to enable the port processor to determine whether or not the message was correctly received. Finally, the message, in its final form, is placed in the downlink buffer, where it can be accessed by the bus interface processor.

Figure 3:
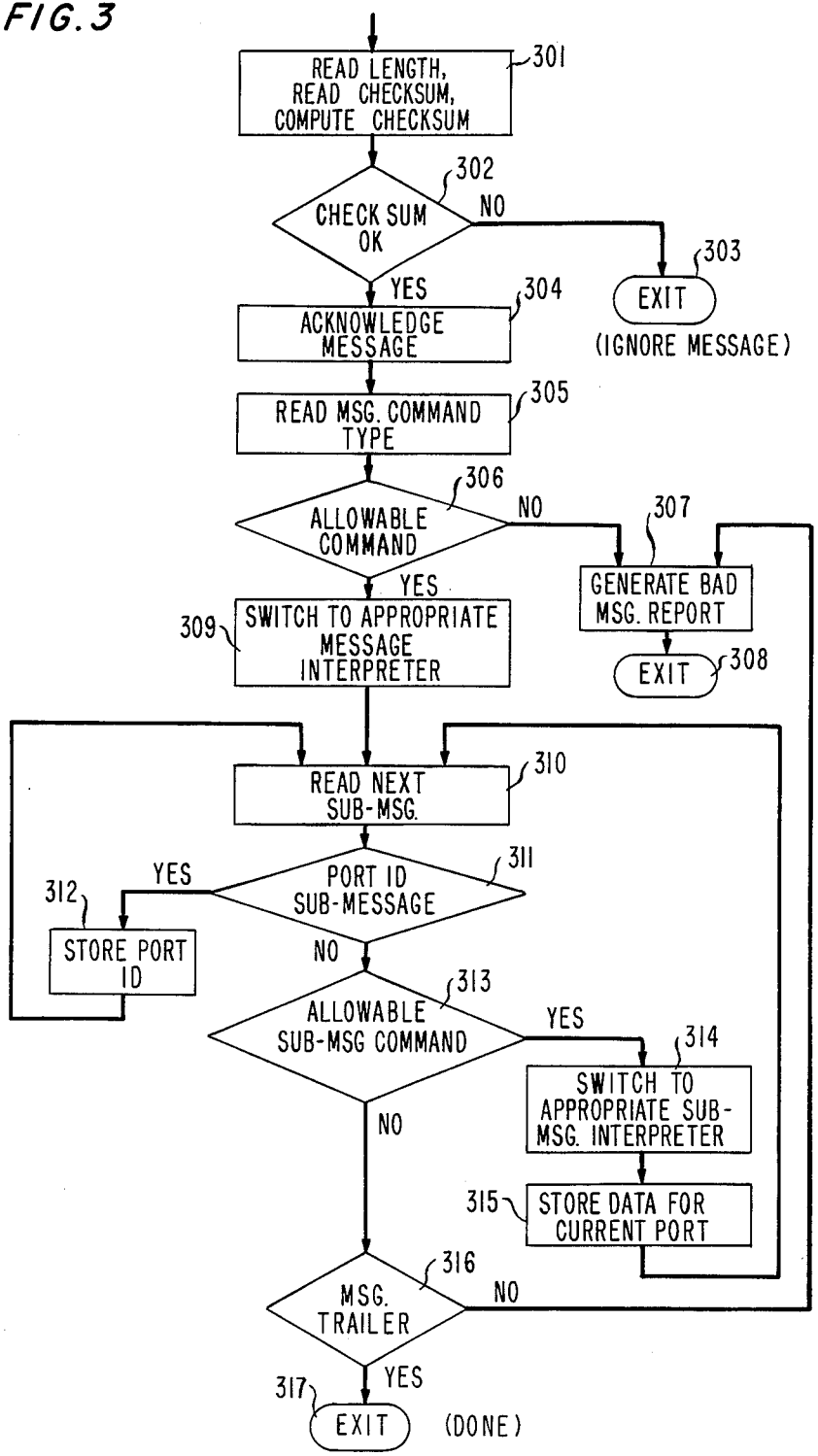

FIG. 3 shows the processor of message interpretation carried out by a port processor. The first step in box 301 is read the length of the message, which is the first byte of the message as seen by the port processor. This allows the port processor to locate the end of the message, where is will find the check-sum, which was computed by the call processor. The port processor takes the message as received and computes its own check-sum, which is then compared against the received check-sum to determine whether or not the message was correctly received. If the message was not correctly received (box 303), the port processor will go no further. Since the port processor will not acknowledge this message, the message will eventually be retransmitted by the call processor. If the message was correctly received, the port processor generates an acknowledgement (box 304), which is transmitted over the bus back to the call processor. This acknowledgment indicates that the message identified by the particular sequence number was correctly received.

Box 305 looks at the next byte of the message to determine the message command or type. On the basis of this information the port processor determines (box 306) whether the command is allowable or not. If not, it generates a report to the call processor (box 307) saying that it has received a bad message, and will go no further. It will now exit.

If, on the other hand, the message is an allowable command, the port processor proceeds to box 309, where it switches to the message interpreter routine which is capable of interpreting the particular type of command. Once in the message interpreter (box 310), the first submessage is examined. Usually that first sub-message will be a port ID sub-message. The port processor determines the type of sub-message by looking at the three most significant bits, which are the qualifier for the submessages. If this is a port ID sub-message, the port ID information is stored (box 312), so that all further submessages can be understood as being destined for that particular port. If it is not a port ID sub-message, then it will either be an allowable sub-message of some other type, or a message trailer indicating that this is the end of the message. Therefore, box 313 controls a switch to review box 314 or box 316. Box 314 controls the switch to the appropriate sub-message interpreter on the basis of the qualifier code in the most significant three bits of the first byte of that sub-message. The sub-message interpreter routine (box 315) takes the data that is in the sub-message and stores it in an appropriate memory location, which is determined by the nature of the submessage and the port ID which has previously been received. Once this routine is finished, box 314 controls a return to box 310 where the next sub-message is read.

In the event that the sub-message had not been an allowable one, box 313 would control a move to box 316 to determine whether, as indicated by the qualifier, the message is a valid trailer containing a sequence number and a check-sum. Such a trailer would indicate that interpretation of the message is completed. If it is not a valid message trailer, box 316 controls a return to box 307 to generate a bad message report.

Whenever the routine returns to box 310 to read the next sub-message, if there is a new port ID, as indicated by the qualifier code, it is necessary to go to box 312 where the new port ID is stored, so that further sub-messages can be interpreted as being determined for the correct port.

Network Control Message

Let us now look at some examples of how this invention can be put into practice in a PBX system. The first example is that of a network update message, used in the situation where there is an existing four party conference call to which we wish to add a new party.

FIG. 4 shows the layout of the bytes comprising the message which would be sent from the call processor to a particular port processor. The first byte of the message, shown in block 401, would contain bits corresponding to the overall message length. Box 402 shows the command describing the type of message which is to follow. In this case, it is a network update command (00001), which is encoded as shown in the least significant (right most) five bits. The most significant three bits of that byte (000) make up the qualifier, indicating that this is a message header.

The next byte (403) of the message is a one byte sub-message, containing the qualifier 001, which indicates that this is a port ID sub-message. The least significant five bits of byte 403 would contain the actual port number.

The next sub-message is made up of bytes 404, 405, and 406. The first byte of the sub-message contains the qualifier 010, which identifies this sub-message as being a "Talk" sub-message. In the first byte of the sub-message, the a bit determines whether we select bus A or bus B, and the b bit controls the enabling or disabling of "talking" on the scheduled bus. Byte 405 is issued to store the time slot number, while byte 406 is used to control the gain value. The lower four significant bits, contain the gain value in DB, and the s bit determines whether this is actually a gain or a loss.

The next four sub-messages, which all begin with the qualifier 011, are "Listen" sub-messages. Each one of these sub-messages instructs the port processor to listen to a particular time slot on the time division bus. Each additional sub-message of this type causes the (NPE) of the aforementioned (Baxter application) to sum speech samples from the time division bus from the specified time slot with all other samples, so that a conference call can be established. Again, in the first byte of each submessage, for example, byte number 407, there is a bit (a) which selects bus A or bus B, and byte 408 contains the time slot assignment. In byte 409 there is a gain value, which again can be a gain or loss as determined by the s bit.

Following the four "Listen" sub-messages, there is a trailer (byte 419) identified by the 111 qualifier. The sequence number of the message is contained in byte 419 and the check-sum is in byte 420. From FIG. 4 it is clear that any number of sub-messages can be combined into a single message.

Figure 5:
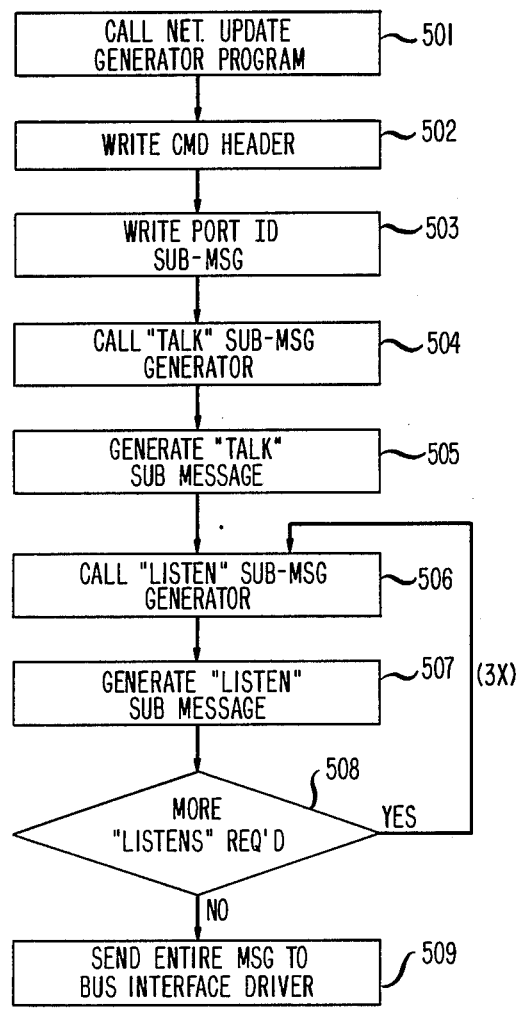

FIG. 5 shows the process to be carried out by the call processor when it is necessary to generate the network connection message just described. This routing is a special case of the routine shown in FIG. 2, which is the general sequence of events involved in message generation.

The first step in FIG. 5 is box 501, which calls the network update generator routine. Box 502 writes the command header, and box 503 writes the first sub-message, containing the port ID. In the next step, box 504, the "Talk" sub-message generator is called, and in box 505 the "Talk" sub-message is actually generated.

Next, there is generated a sequence of four "Listen" sub-messages, by first calling the "Listen" submessage generator (box 506), which, in box 507, generates the first "Listen" sub-message. Box 508 determines if more "Listen" sub-messages are required in this particular message. In the example, box 508 again calls box 506, the "Listen" sub-message generator. This is repeated three times, so that there is generated the four necessary "Listen" sub-messages. Finally, the routine goes to box 509, where the entire message is sent to the bus interface driver.

Figure 6:
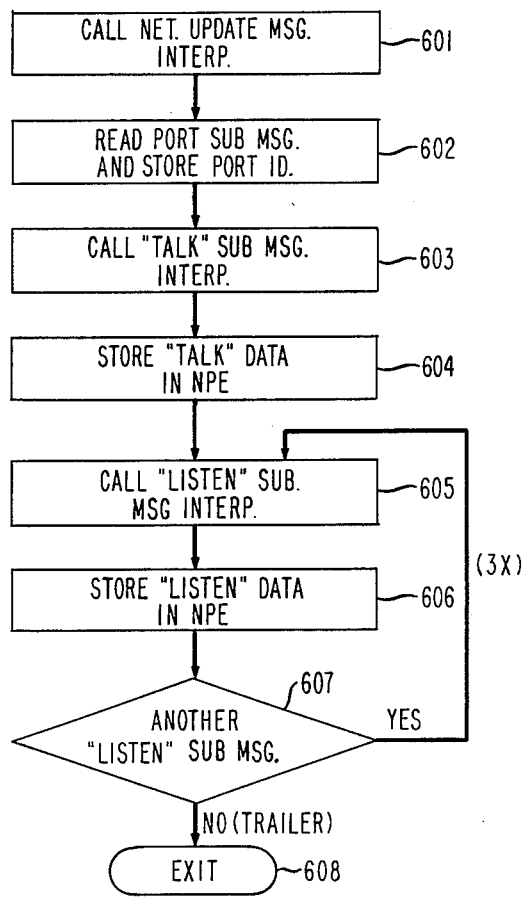

FIG. 6 shows the process for interpretation of the just discussed network update command, as carried out by the port processor. For this discussion we will assume that the message was correctly received, i.e., the checksum computed by the port processor agreed with the checksum at the end of the message.

The first byte of the message indicates that this is a network update command. Therefore, in box 601, the network update message interpreter is called. In box 602, the network update message interpreter would read the first sub-message, which it would recognize by the qualifier as a port ID sub-message. It would take the port ID included in this sub-message and store it for later use.

In box 603, the network update message interpreter determined from the received data that the next sub-message is a "Talk" sub-message, so it calls the "Talk" sub-message interpreter. In box 604, the "Talk" sub-message interpreter takes the data included in that sub-message and stores it in the NPE portion of the port processor (shown in the aforementioned Baxter application). The data in the NPE now causes speech samples from the specified port to be placed on the time division bus in the correct time slot, as detailed in the Baxter application.

Next, in box 605, having returned to the network update message interpreter, the next sub-message is recognized as a "Listen" sub-message, so the "Listen" sub-message interpreter is called. Then, in box 606, the "Listen" sub-message interpreter analyzes the data in the sub-message and stores the data in the NPE. Box 607 controls the return three more time to box 605 for the next three sub-messages. After the last "Listen" submessage, the routine reaches the message trailer and, having already acknowledged the message, nothing further remains to be done.

Station Message

Figure 7:
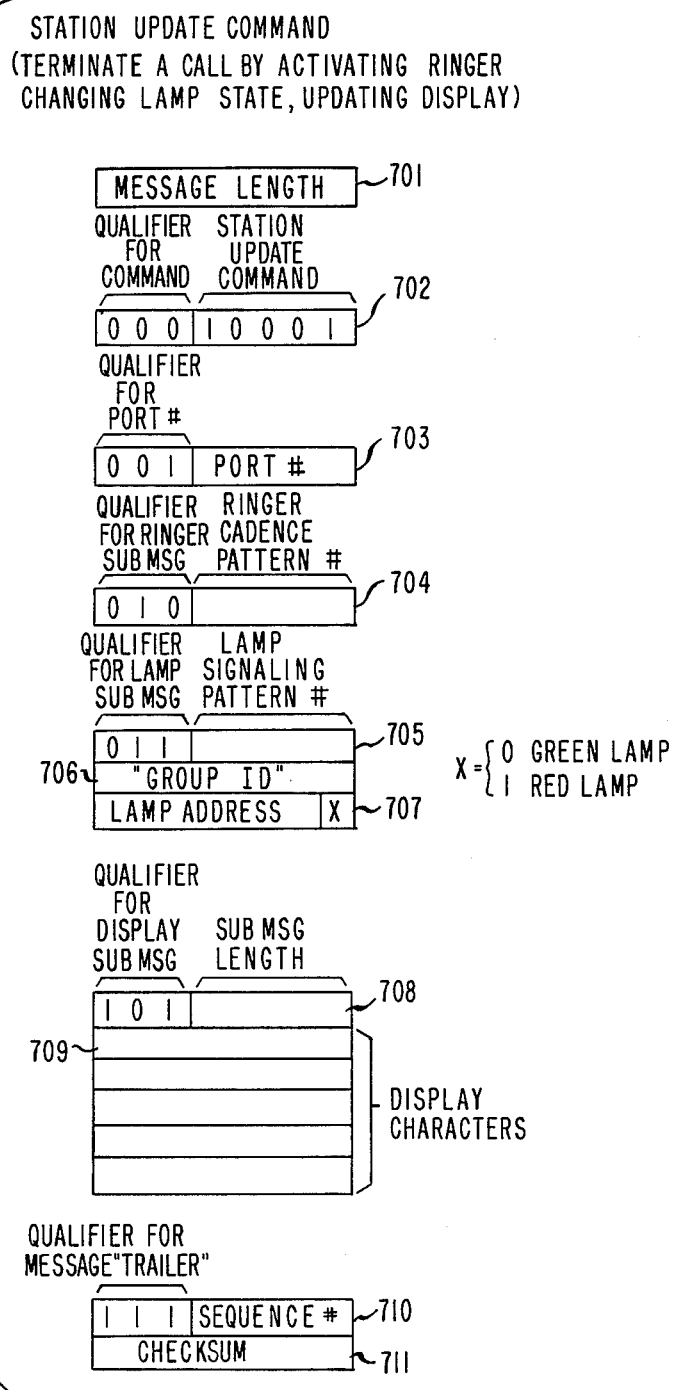

We will now look at another example of the use of this invention in a PBX system. In this example, multiple sub-messages will be delivered to a station. FIG. 7 shows the layout of a station update command. In this particular example, we will terminate a call to a PBX station. When this is accomplished, it is necessary to activate the ringer at that station, to change the state of a lamp (or lamps) at that station, and in some cases to update a character display which may also be part of the station set. This display might be used, for example, to indicate the name of the calling party or the calling station number.

Therefore, as shown in FIG. 7, we begin as usual with the overall message length, as shown in box 701. Box 702 contains a station update command, which is encoded 10001. Next, box 703 contains a port ID sub-message, as indicated by the qualifier code 001; the port ID itself is stored in the lower five bits in byte 703.

The next sub-message is represented by byte 704. This is a ringer control sub-message, as indicated by the qualifier 010. The actual information identifying the particular ringing pattern to be used in this case is stored in the lower five bits of byte 704. The next submessage in the station upate command is shown by bytes 705, 706, and 707. The qualifier indicating that this is a lamp sub-message is 011, and, in byte 705, the lower five bits indicate the lamp signaling pattern desired. The next byte of the sub-message, box 706 contains the group ID, which identifies the adjunct module associated with this station containing the particular lamp. Byte 707 contains the lamp address on that particular module, and the X-bit indicates whether it is a green lamp or a red lamp.

The next sub-message is a display sub-message, which contains the characters to be displayed on a display module. The qualifier 101 indicates that this is a display sub-message. The internal length of the submessage is stored in the lower five bits of byte number 708. Following this, beginning with byte number 709, there are stored the characters making up the actual display message. Lastly, beginning with byte 710, we have the usual message trailer, which is indicated by the qualifier code of 111.

Figure 8:
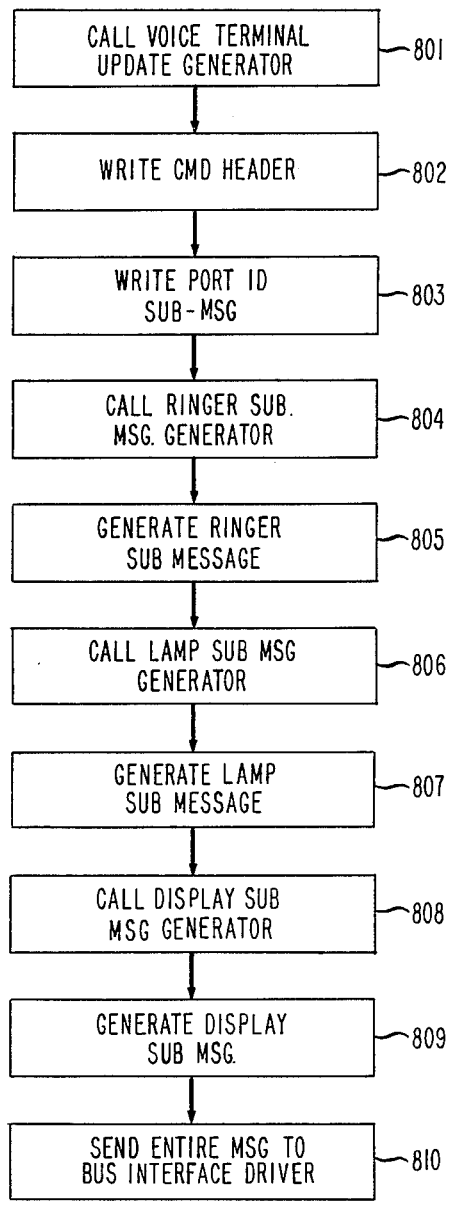

FIG. 8 shows the procedure carried out by the call processor for generating the station update command just described. Assume that we are now at a point in the program where it is necessary to send the station update command to a particular port processor. Therefore, as shown in box 801, it is necessary to call the voice terminal update generator subroutine. Once in the subroutine (box 802), the command header is written. Next, in box 803, the first sub-message is written, which is a port ID sub-message. Box 804 calls the ringer submessage generator, which, in turn (box 805) generates the ringer sub-message. The lamp sub-message generator (box 806) next generates the lamp sub-message (box 807). Box 808 calls the display sub-message generator program, box 809, to generate the display sub-message. When this is finished, this entire message is sent to the bus interface driver.

Figure 9:
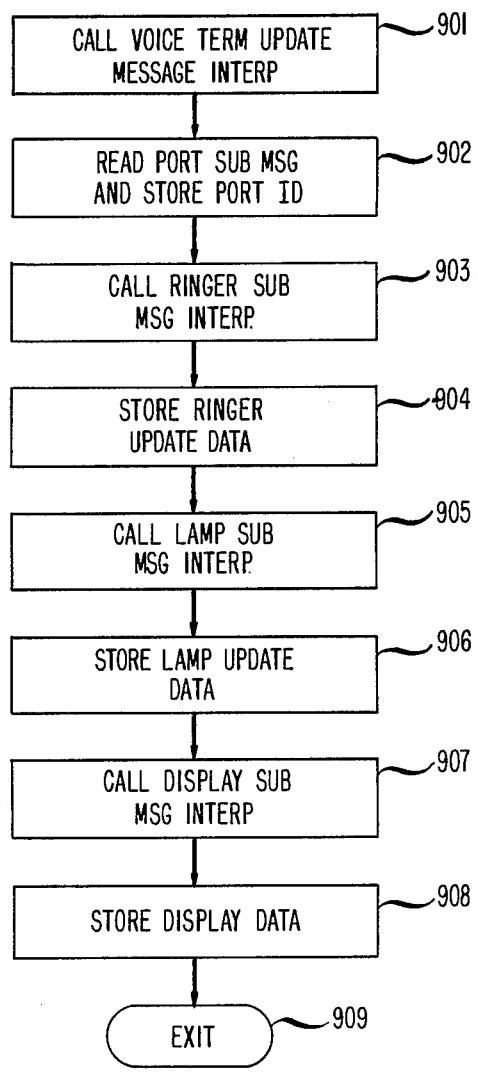

In FIG. 9, we see the procedure in the port processor for interpretation of this station update command, and again we assume that the message was correctly received, and therefore acknowledged. Box 901 recognizes that this is a voice terminal update command and calls the voice terminal update message interpreter. In box 902, inside the voice terminal update message interpreter, is read the first sub-message, which is determined to be a port ID sub-message. Therefore, the port ID is stored for use with subsequent sub-messages. Then, as shown in box 903, the ringer sub-message interpreter is called, which, box 904, extracts the ringer update data and stores it in the proper place in memory, as determined by the previously stored port ID. Box 905 then calls the lamp sub-message interpreter which, as shown in box 906, stores the new lamp data.

Box 907 recognizes the beginning of a display sub-message and, as shown in box 908, stores the display data. Finally, the message trailer is recognized, after which there is no further message interpretation necessary.

Trunk Update Command

For the final example of the application of my invention, I have shown, in FIG. 10, the layout of a message which is sent to a port processor controlling a trunk to a central office. The message contains a command to the trunk circuit to outpulse a sequence of seven digits over the trunk. In the byte labeled 1001 we have the usual overall message length. In byte 1002 we would have the trunk update command, which is encoded 11001. Next, the first sub-message is represented by byte 1003. The qualifier 001 indicates that this is a port ID submessage, and as usual, the port number itself is stored in the lower five bits of byte 1003. Next, we have a sequence of seven sub-messages, each of which is one byte long. Each sub-message is indicated to be an outpulse sub-message by means of the qualifier 011, and in each case the encoded digit to be outpulsed is stored in the lower five bits of the sub-message byte. Finally, at the end we would have the message trailer which, as usual, is indicated by the qualifier code 111.

FIG. 11 shows the procedure followed by the call processor is generating the trunk update command just described. This command must go to a particular port processor responsible for controlling central office trunks. To begin, box 1101 calls the trunk state update generator routine, which, in turn (box 1102), first writes the command header indicating that this is a trunk state update message. Box 1103 then writes the first sub-message, which is a port ID sub-message. In box 1104, the out-pulse sub-message generator routine is called, which, as shown in box 1105, generates the first single digit outpulse sub-message. This routine loops until there are generated all the necessary outpulse sub-messages, one for each digit to be outpulsed. For the example discussed, there would be six repetitions of the loop between box 1106 and box 1105. Finally, the routine reaches box 1107, where the entire message is sent to the bus interface driver.

In FIG. 12 there is shown the procedure for the interpretation of this trunk update command as carried out by the port processor. Again, we assume that the message was correctly received, so that in box 1201, having recognized that this is a trunk state update message, the trunk state update message interpreter is called. In box 1202, the port ID sub-message is stored. In box 1203, the outpulse sub-message interpreter is called, since the next sub-message is recognized by the qualifier code as an outpulse command. Box 1204 stores the digit that is going to be outpulsed. Since we have six more sub-messages to be outpulse, the routine returns back to box 1203 six more times in order to interpret all the outpulse submessages. Finally, the message trailer indicates that there is no further message interpreting to do.

Specific Application

So far we have been discussing the procedure for the generation and interpretation of the messages used in a PBX system in such a way that knowledge of the details of the physical hardware arrangement of the system is not necessary, so that the procedures just discussed can be implemented on any one of a number of systems. However, let us now look at the consequence of these procedures applied to the hardware arrangement of a particular system, such as that shown in FIG. 1. One system of processor intercommunications is to use a time division bus, and to dedicate a certain number (for example five) of time slots of each frame to the transmission of control message. One time slot of each frame would then contain the destination address of the processor to which the bytes of the other (four) time slots are directed.

Downlink Processing

Figure 13:
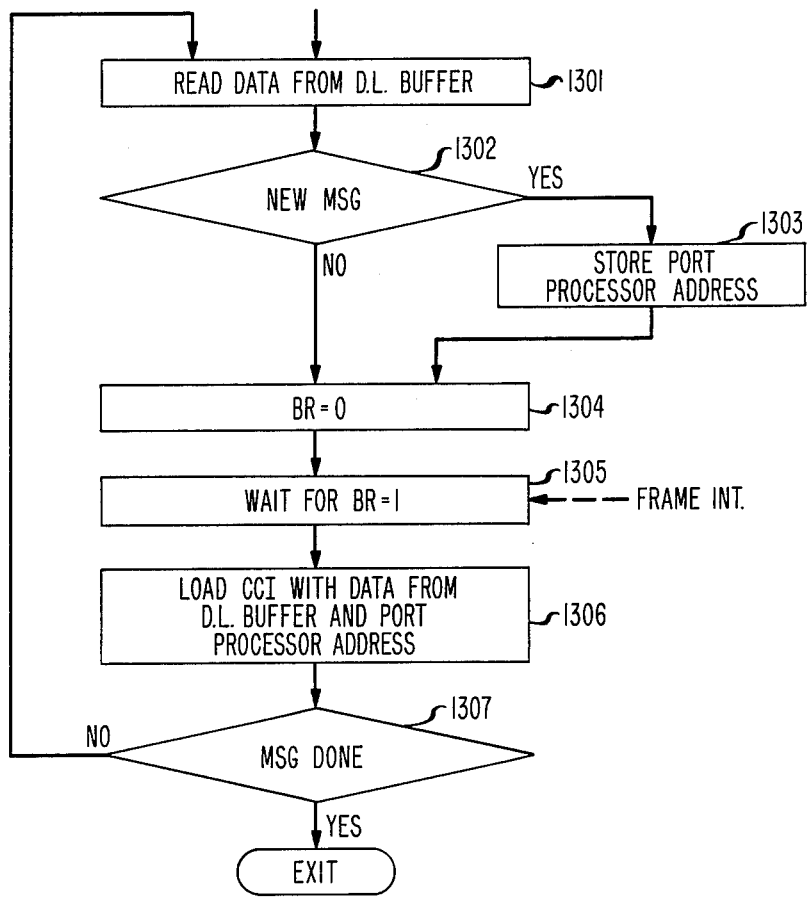

FIG. 13 shows the procedure for message handling in the downlink direction (from the bus interface processor to the port processor) as carried out by the bus interface processor. The bus interface processor receives data from the call processor by means of a downlink buffer (a dual-ported memory device), and sends this data by way of the CCI over the time division multiplex bus. This data is picked up by the CCI associated with the particular destination port processor.

The first step in FIG. 13, as shown in box 1301, would be for the bus interface processor to read data from the downlink buffer. At this initial point, this data is recognized, via box 1302, as the beginning of a new downlink message. In box 1303, the address of the destination port processor is stored for continual use until the entire message has been sent. In box 1304, in order to be synchronized with the time division bus, the bus ready, or BR, flag is set to zero. The procedure then waits until a frame interrupt occurs, the result of which is that the BR flag is set to one.

Once the BR flag is set to one (box 1306), the CCI is loaded with four bytes of data stored in the downlink buffer, as well as the destination port processor address. Box 1307 then determines whether all of the bytes making up this particular message have been sent. If so, the process is finished. If not, the routine goes back to box 1301, where more data is read from the downlink buffer, thus executing another cycle of this procedure. The procedure continues, sending four bytes per cycle, until the entire message has been sent.

Figure 14:
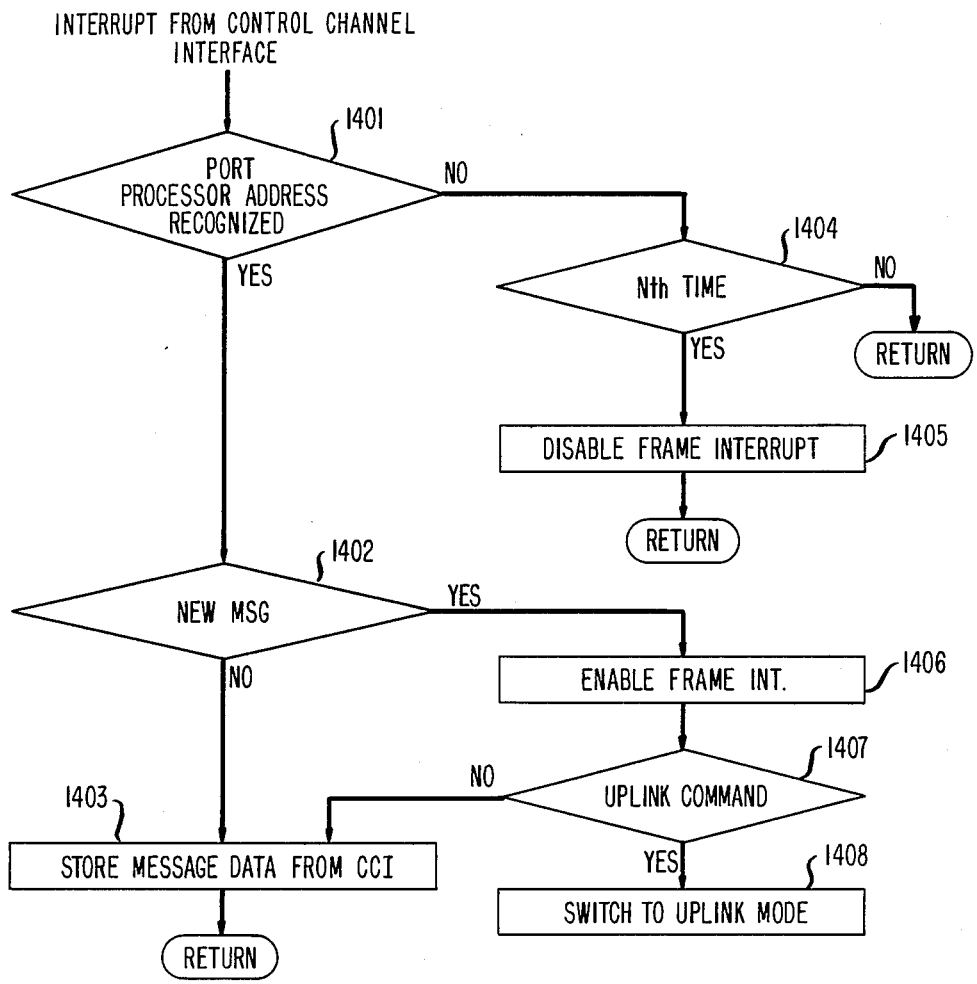

In FIG. 14, the procedure for downlink message handling is shown, as executed by a port processor. Entry into this procedure, shown by the arrow leading into box 1401, occurs on an interrupt from the CCI. This interrupt occurs for one of two possible reasons. The first is that the CCI recognized its unique address on the time division bus, which would mean that there is a message arriving for this particular port processor. The other reason is that the CCI is in a mode where the interrupt is occurring on every 125 microsecond frame on the time division bus. Which one of these two interrupt modes is in operation at any port in time is determined by the current setup of the CCI, which is under the control of the port processor. Normally, the CCI is in a mode where it only interrupts the port processor when its address is recognized on the time division bus, i.e., at the beginning of a new downlink message or a request for an uplink message. Therefore, initially, box 1401 is entered due to an interrupt from the CCI caused by recognition of the port processor's address on the time division bus. Following this logic the system goes to box 1402 where it is necessary to determine whether this is a beginning or continuation of a message. The port processor determines this by interrogating the CCI to find out which of the two interrupt modes is currently operating. If the CCI is in the address recognition interrupt mode, then a new message is assumed. In this case, box 1406 is entered, so that the CCI is now in the frame interrupt mode. Next, since this is a new message, the system must determine (box 1407), whether this is the beginning of a downlink message or whether it is a request for an uplink message. This determination is made from the first byte of the data just received and stored in the CCI. If the data contains a specific code indicating this to be an uplink request, then the uplink mode of operation, as shown in box 1408, is enabled. We will examine that procedure in a later figure. If this data is not an uplink command, then the system determines that it is dealing with the beginning of a downlink message and, in box 1403, the message data is read from the CCI and stored in internal memory.

The next interrupt from the CCI occurs since, under control of box 1406, the frame interrupt had previously been enabled. The system must determine, as shown in box 1401, whether the address of this particular port processor has again been recognized on the time division bus. If so, the system proceeds to box 1402, and since this is known not to be a new message, because the CCI is in the frame interrupt mode, data from the CCI is stored in the internal memory (box 1403).

If, however, the system enters box 1401, but the processor's address had not been recognized, control goes to box 1404 to determine how many consecutive frame interrupts have occurred without port processor address recognition. This is allowed to occur a fixed number of times (N) before it is concluded that the message has actually been completed. Therefore, if this is the Nth consecutive time that box 1404 has been entered, the system disables the frame interrupt (box 1405). If, however, this is not the Nth time, no action is taken. The reason for such a procedure is that it gives the system a way to recognize the end of the message, and also allows for the possibility that the bus interface processor is momentarily (for N-1 frames) unable to keep up with the framing rate. This port processor is thus made to tolerate N-1 consecutive frames without recognition of its address before it assumes that this is the valid end of a message.

Uplink Processing

FIG. 15 shows the procedure for uplink (from the port processor to the bus interface processor) message handling as carried out by the port processor. This procedure may begin in two ways, either by way of box 1408 of FIG. 14 (due to a downlink message which the port processor recognizes as a request by the bus interface processor to transfer an uplink messge to it), or on successive frame interrupts. Accordingly, on initial entry (box 1501), the message header (first byte of the uplink message) is loaded into the CCI. Then, box 1502 controls the transfer of additional bytes of uplink data to the CCI. Box 1503 then determines whether or not the entire uplink message has been sent. If not, there is nothing further to be done until the procedure continues on the next frame interrupt. If the message is finished, box 1504 clears the activity flag (the means by which the port processor originally signaled the bus interface processor that it had an uplink message). Box 1505 then disables the frame interrupt which had set in FIG. 14 (box 1406) at the beginning of the uplink message request.

On the successive interrupts after the initial entry (which are due to frame interrupt coming from the CCI) the uplink procedure is entered via box 1506, which first determines whether the port processor's address was recognized. If it was recognized, box 1502 controls the data transfer of the uplink message data into the CCI. If the port processor's address had not been recognized, then the system must determine whether this non-address recognition on a frame interrupt has occurred for the Nth consecutive time. If not, this just means that the bus interface processor has once again been unable to keep up with the time division bus. If, however, this situation has occurred for the Nth time, it means that for some reason there has been an abort of the normal uplink message handling procedure, and it will be necessary to try to send the same uplink message to the bus interface processor at a later point in time. Therefore, the system proceeds to box 1508, where the uplink message pointer is restored to the beginning of the uplink message, so that the system can subsequently reattempt the message. Box 1509 disables the frame interrupt, so that the system will not return to this procedure until a new uplink request is received from the bus interface processor.

FIG. 16 shows the procedure for message handling in the uplink direction as executed by the bus interface processor. This procedure is carried out for each port processor which has signaled to the bus interface processor by setting an activity flag declaring that it has a message to send uplink. The first step is to achieve synchronization with the time divison bus, by clearing the BR flag to zero (box 1601), and then waiting (box 1602) for the BR flag to be set to one by the frame interrupt handler. This will occur on the next frame interrupt from the CCI.

Box 1603 loads into the CCI the address of the port processor from which the uplink message is to be received. This port processor address is also stored in the uplink buffer, since the message source address must be the first byte of the uplink message when it is read by the call processor. Next, in box 1604, the special uplink command is loaded into the CCI. This will indicate to the port processor that it is being polled for delivery of an uplink message.

Next, as shown in boxes 1605 and 1606, the system waits for the next occurrence of the frame interrupt, in order to insure that this message has actually been sent to the port processor. In box 1607, the port processor's address is again loaded into the CCI, since in this frame the port processor will be starting to send the data comprising the uplink message over the time division bus in the upward direction. Again, the system must wait for synchronization with the time division bus in order to determine when the uplink data has arrived. Boxes 1608 and 1609 control this function. In box 1610, the uplink message data read out of the CCI is stored in the uplink buffer.

Next, in box 1611, the system determines from the first byte of the actual uplink data whether or not this message is complete. This determination is deduced from the type of message being received. If the message is not completed, the procedure returns to box 1607, where the port processor's address is reloaded so that the message can continue on the next frame. If the message is completed, box 1603 is reentered, where the entire process is repeated with a new port processor's address.

Conclusion

While the embodiment shown has a central processor formatting messages to peripheral processors it is understood that the peripheral processors, could be designed to format messages to each other using the disclosed structure. It is also understood that any type of structure could be used for handling communication between processors.

What is claimed is:

1. A data processing or distributed control or telecomputing or telecommunications or telephone network system having a plurality of processors and a bus for communicating messages among said processors, said system comprising means in a transmitting one of said processors for forming one such message to include a single header and a plurality of sub-messages, said header including a context byte and each sub-message comprising a qualifier code, said qualifier code of each sub-message and said context byte of said header jointly identifying for each sub-message a respective one of a plurality of system operations to be performed, and means in a receiving one of said processors for determining for said one message the system operation associated with each sub-message, each determination being jointly responsive to the qualifier code of a different sub-message and said context byte of said header.

2. The communication system of claim 1 wherein said determining means determines for said one message the system operation associated with each sub-message jointly in response to the qualifier code of that sub-message and the context byte of said header.

3. The communication system of claim 1 further including means at said receiving one of said processors for monitoring said bus for recognition of said one message and said determining means being responsive to said monitoring means.

4. The communication system of claim 3 wherein said monitoring means further comprises means responsive to the recognition of said one message for removing from said bus all of this message including the header and all associated sub-messages.

5. The communication system of claim 1 wherein said forming means forms said one message to include an address identifying said receiving one of said processors.

6. The communication system of claim 5 wherein forming means forms said said one message to include one byte for said address and at least one byte of data.

7. The communication system of claim 1 wherein said one message is transmitted in components each separated by no more than a preselected number of frames and said determining means receives said one message and determines an end to said one message by counting a preselected number of frames being received components.

8. A peripheral control circuit for use in a data processing or distributed control or telecomputing or telecommunications or telephone network system having a plurality of processors and a bus for communicating messages among said processors, said control circuit comprising means for receiving one message from said bus, said one message comprising a single header and a plurality of sub-messages, each header comprising a context byte and each sub-message comprising a qualifier code, said qualifier code of each sub-message and said context byte of said header jointly identifying for each sub-message a respective one of a plurality of system operations to be performed, and means responsive to the received said one message for determining the system operation associated with each sub-message, each determination being jointly responsive to the qualifier code of a different sub-message and said context byte of said header.

9. The peripheral control circuit of claim 8 wherein said determining means determines for said one message the system operation associated with each sub-message jointly in response to the qualifier code of that sub-message and the context byte of said header.

10. The peripheral control circuit of claim 8 wherein said determining means includes means for monitoring said bus for recognition of said one message and said determining means being responsive to said monitoring means.

11. The peripheral control circuit of claim 10 wherein said monitoring means further comprises means responsive to said one message for removing from said bus all included sub-messages and the header.

12. The peripheral control circuit of claim 8 wherein said one message is received in components each separated by no more than a preselected number of frames and said determining means determines an end to said one message by counting a preselected number of frames without receiving any component.

13. A method of communicating messages between processors interconnencted by a bus in a data processing or distributed control or telecomputing or telecommunications or telephone network said method comprising the steps of forming, in a transmitting one of said processors, one such message to include a single header and a plurality of sub-messages, each header comprising a context byte and each sub-message comprising a qualifier code, said qualifier code of each submessage and said context byte of said header jointly identifying for each sub-message a respective one of a plurality of system operations to be performed, and determining for one such message, in a receiving one of said processors, the system operation associated with each sub-message, each determination being jointly responsive to the qualifier code of a different sub-message and said context byte of said header.

14. A data processing or distributed control or telecomputing or telecommunications or telephone network system having a plurality of processors and a time-division channel interconnecting said processors, said system comprising, means at a transmitting one of said processors for applying messages to said channel, each message being destined for a receiving one of said processors and each message being applied in the form of a plurality of components each separated from one another by a variable time interval which is no greater than a predetermined amount of time, and means at a receiving one of said processors for retrieving from said channel components destined for that one processor, said retrieving means combining each retrieved component with the previously retrieved components as long as the time interval between said each retrieved component and the component retrieved immediately before it is less than said selected amount of time, whereby the components so combined comprise a complete one of said messages.

15. The communication system of claim 14 wherein said one message includes an address and said retrieving means includes means for monitoring the channel for said address.

16. The communication system of claim 14 wherein each component of said one message includes said address and said monitoring means removes all the components of said one message in response to said address.

17. A peripheral control circuit for use in a data processor or distributed control or telecomputing or telecommunications or telephone network system having a plurality of processors and a channel for communicating messages among said processors, said control circuit comprising means for receiving messages for said channel destined for a receiving one of said processors, each message being received in the form of a plurality of components each separated from one another by a variable time interval which is no greater than a preselected amount of time, and means responsive to said received messages for combining each received component with the previously received component as long as the time interval between said each received component and the component immediately received before it is less than said preselected amount of time, whereby the components so combined comprise a complete one of said messages.

18. The peripheral control circuit of claim 17 wherein said combining means also separates each received component from the previously retrieved components if the time interval between each received component and the component immediately received before it is greater than said preselected amount of time whereby the components so separated comprise different ones of said messages.

19. In a data processing or distributed control or telecomputing or telecommunications or telephone network system a method of determining an end of a message transmitted over a time-division channel between communication entities, said method comprising the steps of applying messages to said channel, each message being destined for a receiving one of said entities and each message being applied in the form of a plurality of components each separated from one another by a variable time interval which is no greater than a predetermined amount of time, retrieving from said channel messages destined for said receiving one of said entities, and combining retrieved components with previously retrieved components as long as the time interval between each retrieved component and the component retrieved immediately before it is less than said preselected number, whereby the components so combined comprise a complete one of said messages.

20. In a data processing or distributed control or telecomputing or telecommunications or telephone network system a method of improving incoming messages for a communication entity, said method comprising the steps of receiving messages from a bus, each message comprising a single header and a plurality of sub-messages, said header comprising a context byte and each sub-message comprising a qualifier code, said qualifier code of each submessage and said context byte of said header jointly identifying for each sub-message a respective one of a plurality of system operations to be performed by said entity, and determining the system operation associated with each submessage jointly in response to said qualifier code of a different sub-message and said context byte.

21. In a data processing or distributed control or telecomputing or telecommunications or telephone network system a method of reassembling each of a plurality of subdivided messages received over a communications channel, said method comprising the steps of receiving messages from said channel, each message being received in the form of a plurality of components each separated from one another by a variable time interval which is no greater than a preselected amount of time, and combining each received component with the previously received component as long as the time interval between said each received component and the component immediately received before it is less than said preselected amount of time, whereby the components so combined comprise a complete one of said messages.

* * * * *